United States Patent [19]

Karaki

[11] 4,221,256
[45] Sep. 9, 1980

[54] SLIDE FASTENER-OPERATED TOP HOOD FOR TRUCKS

[75] Inventor: Takao Karaki, Kurobe, Japan

[73] Assignee: Yoshida Kogyo K.K., Tokyo, Japan

[21] Appl. No.: 43,308

[22] Filed: May 29, 1979

Related U.S. Application Data

[63] Continuation of Ser. No. 951,349, Oct. 13, 1978, abandoned, which is a continuation of Ser. No. 822,233, Aug. 5, 1977, abandoned.

[30] Foreign Application Priority Data

Aug. 9, 1976 [JP]  Japan .......................... 51-106296[U]

[51] Int. Cl.$^2$ .............................................. E06B 3/00
[52] U.S. Cl. ......................... 160/368 R; 160/DIG. 18
[58] Field of Search ........... 160/DIG. 18, 354, 368 R; 24/205 R, 205.15 R, 205.15 H; 223/111

[56] References Cited

U.S. PATENT DOCUMENTS

| | | | |
|---|---|---|---|
| 1,243,458 | 10/1917 | Sunback | 160/DIG. 18 |
| 1,925,815 | 9/1933 | Nicolson | 24/205 R |
| 2,298,783 | 10/1942 | Burnett | 160/354 |
| 3,111,738 | 11/1963 | Bair | 24/205.15 R |
| 3,568,901 | 3/1971 | McNitt | 223/111 |

FOREIGN PATENT DOCUMENTS 1038731  9/1958  Fed. Rep. of Germany ... 160/DIG. 18

*Primary Examiner*—Peter M. Caun
*Attorney, Agent, or Firm*—Bucknam and Archer

[57] ABSTRACT

A top hood for a truck comprises a hood body having an opening, a curtain secured at its leading end to the margin of the opening and coextending with the opening, and two pairs of slide fastener stringers, each pair having an inner and an outer stringer tape each carrying a fastener element row along their respective inner longitudinal edge, the inner tape being secured along the respective marginal edges of the curtain and the outer tape along the respective marginal edges of the opening. A pair of bottom end stops are applied to the respective inner longitudinal edges of the inner and outer tapes at their trailing ends. A slider is threaded onto each pair of stringers to couple and uncouple the same. The slider has a lower wing and an upper wing provided with means for holding the trailing end portion of the element row carried on the inner tape. Further, the top hood comprises means for actuating the sliders to travel forwardly and backwardly along the respective pairs of element rows for engaging and disengaging the same.

8 Claims, 7 Drawing Figures

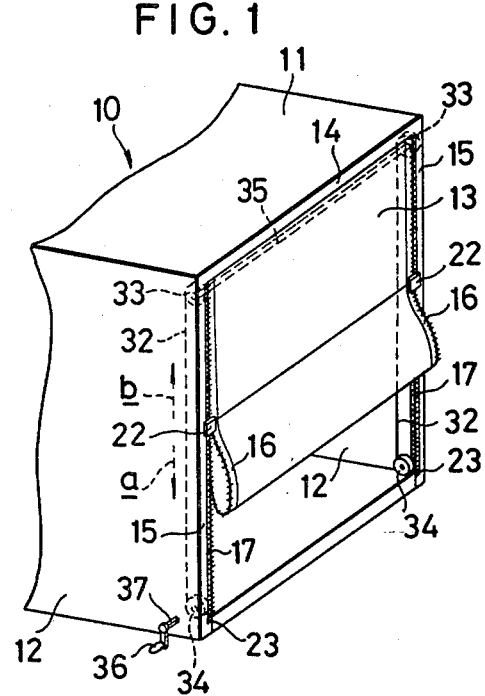
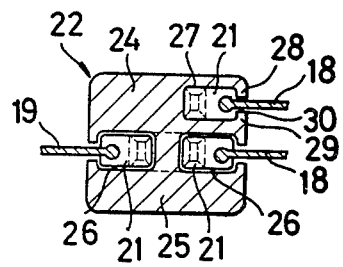
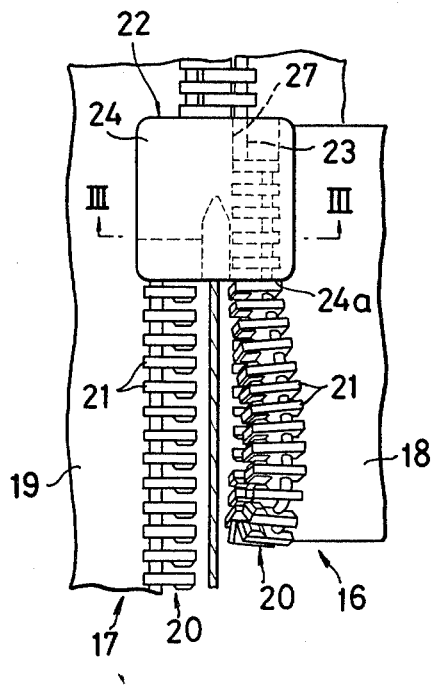
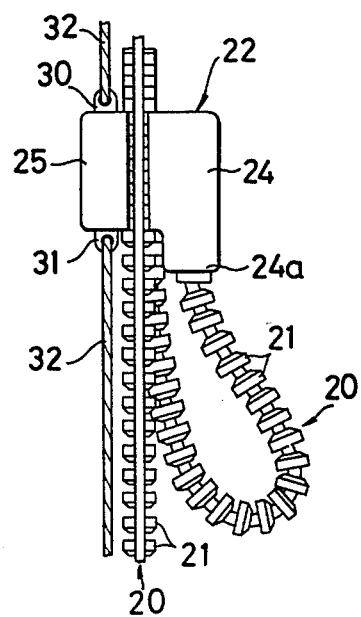

SLIDE FASTENER-OPERATED TOP HOOD FOR TRUCKS

This is a continuation of application Ser. No. 951,349, filed Oct. 13, 1978, now abandoned, which is a continuation of application Ser. No. 822,233, filed Aug. 5, 1977, now abandoned.

BACKGROUND OF THE INVENTION

1. Field of the Invention

This invention relates generally to top hoods or coverings for automotive vehicles, and more particularly to a top hood or covering for trucks or similar freight carriers which is equipped with slide fastener-operated rear curtain.

2. Prior Art

The conventional top hood or covering for trucks has a rear door or curtain of which upper end portion is semipermanently secured to the hood, the side marginal edges of the curtain being releasably secured to the hood with several cords. To open such curtain, the cords must be individually untied and the curtain must be tucked up over the top of the hood each time the truck is loaded or unloaded. Another problem with the conventional hood is that the cords located at remote upper positions are difficult to tie and untie with hands.

One attempt to eliminate these difficulties has been to use conventional slide fasteners for opening and closing the hood curtains. However, in such instance the sliders are required to be manually moved all the way up until they reach the uppermost positions, and then the curtain must be manipulated to turn inside out onto the top of the hood.

SUMMARY OF THE INVENTION

According to this invention, there is provided a top hood for a truck comprising a pair of sliders each having an upper and a lower wing. The upper wing is provided with fastening means for the trailing end portion of the fastener element carried on the inner stringer tape secured to and along the respective marginal edge of the curtain. The top hood further comprises actuation means moving the sliders up and down along the respective pairs of interlocking fastener element rows to open and close the curtain.

Accordingly, it is an object of the invention to provide a top hood, for a truck, with a curtain utilizing slide fasteners, wherein the sliders are allowed to travel upwardly all the way until they reach the uppermost positions which define either an open or closed disposition of the slide fastener, with the curtain being simultaneously pulled up with utmost ease.

Many other advantages, features and additional objects of the present invention will become manifest to those versed in the art upon making reference to the detailed description and the accompanying drawing in which a preferred structural embodiment incorporating the principle of the present invention is shown by way of illustrative example.

BRIEF DESCRIPTION OF THE DRAWINGS

FIG. 1 is a fragmentary perspective view of a top hood for a truck according to the present invention;

FIG. 2 is a fragmentary enlarged plan view of a slide fastener which constitutes part of the hood according to the present invention, showing the disposition of an inner stringer of which trailing end portion is held in a slider.

FIG. 3 is a cross-sectional view taken along the line III—III of FIG. 2;

FIG. 4 is a side elevational view of the slide fastener of FIG. 2;

Like reference characters refer to like parts throughout the various views.

DETAILED DESCRIPTION OF THE PREFERRED EMBODIMENTS

Figure 5:
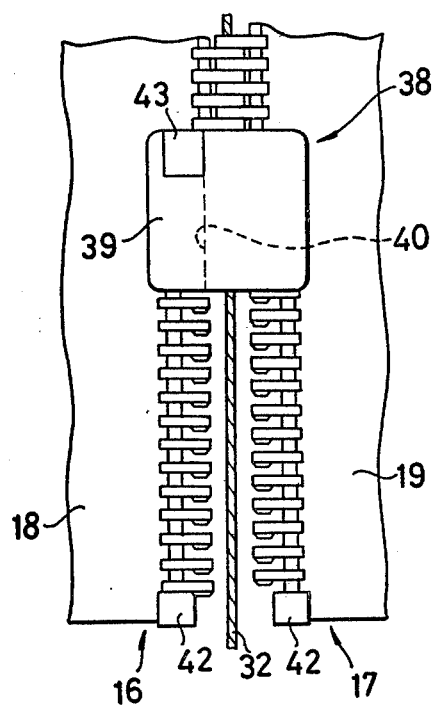
FIG. 5 is a fragmentary plan view of another slide fastener similar to that of FIG. 2 showing a modified form of slider.

Referring to FIGS. 1 and 2, a top hood 10 for a truck comprises a top portion 11, and side walls 12, 12 substantially permanently covering over their respective ways, its rear way being covered with a flaping door or curtain 13. A leading marginal edge of the curtain 13 is secured to and along the rear marginal edge 14 of the top 11 of the hood. The side marginal edges of the curtain 13 are detachably secured to and along the rear inner marginal edges 15, 15 of the side walls 12, 12 through two pairs of fastener stringers 16, 17 and 16, 17, respectively. Specifically, each pair of the (inner and outer) fastener stringers 16, 17 comprises a pair of oppositely disposed inner and outer stringer tapes 18, 19 each carrying along their respective inner marginal edges a row 20 of interlocking fastener elements 21, the fastener stringers 16, 17 being engaged and disengaged by the reciprocal movement of a slider 22 along element rows 20, 20 in the usual manner. Applied to the respective trailing end portions of the inner and outer stringer tapes 18, 19 are a pair of bottom end stops 23, 23.

As best shown in FIGS. 2 through 4, the slider 22 comprises an upper and a lower wing 24, 25 and a Y-shaped guide channel 26 which is disposed between the wings 24, 25 and through which the respective interlocking fastener element rows 20, 20 carried on the inner and outer stringer tapes 18, 19 are threaded.

Provided in the upper wing 24 on its side periphery is a holding groove 27 adapted to frictionally receive the trailing end portion of the fastener element row 20 carried on said inner stringer tape 18 in the groove 27 and extending parallel with the guide channel 26 through the full length of the upper wing 24. The groove 27 has a height substantially equal to the thickness of the single fastener element 21.

The upper wing 24 further has an upper and a lower flange 28, 29 oppositely disposed along the respective longitudinal marginal edges of the groove 27. The upper and lower flanges 28, 29 define therebetween a longitudinal slit 30 coextending with the upper wing 24 and having a height larger than the thickness of the stringer tape 18 and smaller than that of the fastener element 21. This prevents the trailing end portion of the fastener stringer 16 threaded through the groove 27 from coming out or being deflected transversely of the slider 22.

Accordingly, the groove 27 permits portions of the fastener element row 20 received in the groove to be parallel, at least at the bottom 24a of the upper wing 24, with the portions of the same element row adjacent the entrance end for the channel 26.

The lower wing 25 of each slider 22 is provided on the top and bottom ends of the wing 25 with a pair of ears 30, 31, respectively. A substantially looped wire 32 is connected on ends to the respective ears 30, 31 of each of the sliders 22.

Disposed adjacent to the leading and trailing ends of each pair of interlocking element rows 20, 20, as shown in FIG. 1, are an upper and a lower pulley 33, 34 over which the wire 32 is frictionally wound. The upper pulleys 33, 33 are fixedly connected to the respective ends of a common axis 35 extending across the curtain 13 and rotatably supported by a suitable bearing, and are thereby permitted to corotate with each other. One of the lower pulleys 34, 34 is operatively connected to a crank-like operating handle 36 through an axis rotatably supported by a suitably bearing, the other being rotatably supported by its own fixed axis.

To describe the mode of operation of such slide fastener-operated curtain, when the crank-like operating handle 36 is manipulated to rotate counterclockwise about its axis 37 in FIG. 1, all the pulleys 33, 34 and 33, 34 will corotate in the same angular direction, namely counterclockwise to feed the respective loops of the wires 32, 32 in the direction of an arrow a. As a result, the sliders 22, 22 re pulled by the respective wires 32, 32 to travel upwardly along the respective pairs of element rows 20, 20, thereby causing the respective pairs of stringers 16, 17 and 16, 17 to split open. Thus, the curtain 13 rises to be open in response to the upward travel of the sliders 22, 22, since the trailing end portions of the interlocking element rows 20, 20 carried on the respective inner stringer tapes 18, 18 are held in the respective groove 27, 27 of the sliders 22, 22.

In contrast with this, if the handle 36 is manipulated to rotate in the reverse direction, namely clockwise in FIG. 1, the sliders 22, 22 will travel downwardly along the respective pairs of element rows 20, 20 and 20, 20 as all the pulleys 33, 34 and 33, 34 corotating clockwise to feed the loops of the wires 32, 32 in the direction of an arrow b. This downward travel of the sliders 22, 22 causes the curtain 13 to come down to be closed.

Figure 6:
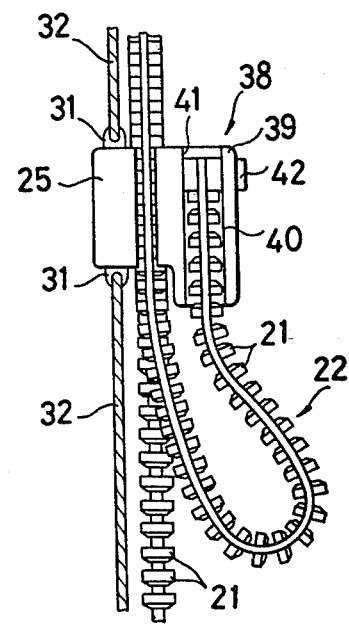
FIG. 6 is a side view of the slide fastener of FIG. 5 but showing the disposition of an inner stringer of which trailing end portion is held in the slider.
Figure 7:
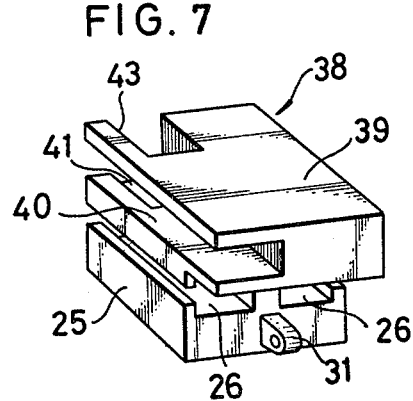
FIG. 7 is a perspective view of the slider shown in FIGS. 5 and 6.

FIGS. 5 through 7 illustrate a modified form of slider 38 comprising an upper and a lower wing 39, 25 and a Y-shaped guide channel 26, the lower wing and the guide channel being of the same parameters as that of the slider 22 shown in the preceeding figures.

Provided in the upper wing 39 on its one side periphery is a groove 40 extending parallel with the plane of the guide channel 26 through the full length of the upper wing 39. To loosely receive in the groove 40 the trailing end portion of the fastener element row 20 carried on the inner stringer tape 18, the groove 40 has a height larger than the thickness of the fastener element 21.

The groove 40 has a major-height groove portion 41 disposed at the top mouth of the groove 40 and communicating with the groove, for releasably holding the bottom end stop 42 in the groove portion 41. For this purpose and especially to prevent the bottom end stop 42 received in the groove portion 41 from coming out or being deflected transversely of the slider 38, the groove portion 41 extends widthwise of the groove 40 and terminates short of the side end of the upper wing 39, while extending height wise of the upper wing 39 beyond the upper and lower inside peripheries of the groove 40. Further, it is essential that the bottom end stop 42 has a thickness larger than the height of the groove 40.

The major-height groove portion 41 includes a cutout portion 43 coextending therewith both lengthwise and widthwise, for allowing the bottom end stop 42 to project outwardly of the upper wing 39 through the cutout portion 43.

In the embodiments described, the holding groove 27 has been described as being constant in height through the full length of the upper wing 24. However, the present invention is not limited to this form of holding groove, and the groove may be gradually decreased in height or in width at its more forward portion. Also, the loop of the wire 32 may be left hanging down as the corrresponding lower pulley 34 as well as the operating handle 36 being eliminated, thereby allowing the operator to directly pull the wire 32 to feed in either direction for opening and closing the curtain 13. In place of the crank-like handle 36, an electric motor may be operatively connected to one of the lower pulleys 34, 34. In addition, the curtain may be secured at its bottom marginal edge to a suitable member, with its top marginal edge being left unsecured.

While specific embodiments of the invention have been shown and described in detail to illustrate the application of the principles of the invention, it will be understood that the invention may be embodied otherwise without deporting from such principle.

What is claimed is:

1. A slide fastener comprising:
   (a) a pair of fastener stringers having a pair of oppositely disposed stringer tapes each carrying a row of interlocking fastener elements along their respective inner longitudinal marginal edges;
   (b) a pair of bottom end stops applied to the respective trailing ends of the respective inner longitudinal marginal edges of said stringer tapes;
   (c) a slider having an upper wing, a lower wing, and a Y-shaped guide channel through which said rows of interlocking fastener elements are to be threaded, said guide channel being disposed between said upper and lower wings; and
   (d) fastening means formed by parts of said upper wing and contoured to receive the trailing end portion of said row of interlocking fastener elements carried on one of said stringer tapes, and to secure said trailing end portion in fixed relation to said slider for movement therewith.

2. A slide fastener according to claim 1, said fastening means including a groove provided on one side periphery of said upper wing and extending parallel with the plane of said guide channel through the full length of said upper wing.

3. A slide fastener according to claim 2, the height of said groove being substantially equal to the thickness of said fastener element so as to frictionally receive the trailing end portion of said fastener element row carried on said stringer.

4. A slide fastener according to claim 3, wherein said upper wing further has an upper and a lower flange oppositely disposed along the respective marginal edges of said groove, said upper and lower flanges defining therebetween a longitudinal slit of which height is larger than the thickness of said stringer tape.

5. A slide fastener according to claim 2, said fastening means further including a major-height groove portion disposed at the top mouth of said groove, of which height is larger than the thickness of said fastener element to loosely receive in said groove said fastener element row said groove portion extending widthwise of said groove and terminating short of the side end of said upper wing, said groove portion extending heightwise of said upper wing beyond at least one of upper and lower inside peripheries of said groove, the height of said groove portion being larger than the thickness of said bottom end stop.

6. A slide fastener according to claim 5, said groove portion further including a cutout portion coextending therewith so as to allow said bottom end stop received in said groove portion to project outwardly through said cutout portion.

7. A slide fastener according to claim 2, said groove being disposed substantially concentrically of a half side portion of said upper wing.

8. A slide fastener according to claim 1, wherein said upper wing extends beyond the bottom end of said lower wing.

* * * * *